(12) United States Patent
Guichard et al.

(10) Patent No.: US 10,939,680 B2
(45) Date of Patent: Mar. 9, 2021

(54) HERBICIDAL COMPOSITION

(71) Applicant: Arysta LifeScience SAS, Nogueres (FR)

(72) Inventors: Aurelien Guichard, Cescau (FR); Christophe Sepulchre de Conde, Pau (FR)

(73) Assignee: ARYSTA LIFESCIENCE SAS, Nogueres (FR)

( * ) Notice: Subject to any disclaimer, the term of this patent is extended or adjusted under 35 U.S.C. 154(b) by 42 days.

(21) Appl. No.: 15/124,605

(22) PCT Filed: Mar. 11, 2015

(86) PCT No.: PCT/FR2015/050606
§ 371 (c)(1),
(2) Date: Sep. 8, 2016

(87) PCT Pub. No.: WO2015/136221
PCT Pub. Date: Sep. 17, 2015

(65) Prior Publication Data
US 2017/0013835 A1 Jan. 19, 2017

(30) Foreign Application Priority Data

Mar. 11, 2014 (FR) .................................... 14 51982
Mar. 11, 2014 (FR) .................................... 14 51983

(51) Int. Cl.
*A01N 35/10* (2006.01)
*A01N 43/60* (2006.01)
*A01N 41/12* (2006.01)
*A01N 43/40* (2006.01)
*A01N 43/76* (2006.01)

(52) U.S. Cl.
CPC ............ *A01N 41/12* (2013.01); *A01N 43/40* (2013.01); *A01N 43/60* (2013.01); *A01N 43/76* (2013.01)

(58) Field of Classification Search
None
See application file for complete search history.

(56) References Cited

U.S. PATENT DOCUMENTS

| | | | |
|---|---|---|---|
| 5,296,449 A | 3/1994 | Ryan et al. | |
| 5,428,001 A | 6/1995 | Somers et al. | |
| 5,629,262 A | 5/1997 | Auxier et al. | |
| 6,864,217 B2 | 3/2005 | Hacker et al. | |
| 2002/0123428 A1 | 9/2002 | Hacker et al. | |
| 2003/0069138 A1 | 4/2003 | Hacker et al. | |
| 2004/0018940 A1* | 1/2004 | Hacker .................. | A01N 35/10 504/106 |
| 2007/0238615 A1* | 10/2007 | Krause .................. | A01N 25/28 504/100 |
| 2013/0130899 A1 | 5/2013 | Hacker et al. | |
| 2013/0143743 A1 | 6/2013 | Hacker et al. | |

FOREIGN PATENT DOCUMENTS

| | | |
|---|---|---|
| AU | 587549 | 8/1989 |
| CN | 1759673 | 4/2006 |
| CN | 101326917 | 12/2008 |
| CN | 102027907 | * 4/2011 |
| CN | 102027907 A | * 4/2011 |
| CN | 102027908 A | * 4/2011 |
| CN | 102027917 A | * 4/2011 |
| CN | 102696617 | 10/2012 |
| CN | 102696617 A | * 10/2012 |
| EP | 052687 | 5/1993 |
| JP | 4594525 | 9/2010 |
| RU | 2005115121 | 2/2006 |
| WO | 00/03591 | 1/2000 |
| WO | 03/030642 | 4/2003 |
| WO | 2004/034788 | 4/2004 |

OTHER PUBLICATIONS

Blackshaw et al., Broadleaf herbicide effects on clethodim and quizalofop-P efficacy on volunteer wheat (*Triticum aestivum*), Agriculture and Agri-Food Canada, Lethbridge, AB, T1J 4B1, Can. Source: Weed Technology (2006), 20(1), 221-226 (Year: 2006).*

Burton et al., Inhibition of corn acetylCoA carboxylase by cyclohexanedione and aryloxyphenoxypropionate herbicides, Pesticide Biochemistry and Physiology (1989), 34(1), 76-85 (Year: 1989).*

Teng et al., Resistance of quizalofop-p-ethyl and sethoxydim against *Digitaria sanguinalis*(L.) scop in soybean fields in Shandong province, Nongyao (2012), 51(6), 457-460 (Year: 2012).*

Huang et al., Cross-resistance of Alopecurus aequalis to sethoxydim and quizalofop-P-ethyl in rape fields, Nongyao (2008), 47(9), 679-681, 688. (Year: 2008).*

Huang et al., Field trails of 120 g/L clethodim EC on cotton A, Nongyao Kexue Yu Guanli (2008), 29(11), 48-49, 37 (Year: 2008).*

Chen et al., Field experiment of 120 g/L clethodim emulsifiable concentrate on controlling weeds in spring soybean fields, Nongyao Kexue Yu Guanli (2008), 29(2), 27-29 (Year: 2008).*

Zhang et al. Activity to weed control and safety to sweetpotato of quizalofop-p-ethyl, Nongyao (2012), 51(6), 457-460 (Year: 2012).*

Chambers et al., Annual Ryegrass and Volunteer Cereal Control in Lupins Using Selective Post-Emergent Herbicides, Australian Journal of Experimental Agricultural and Animal Husbandry, Jan. 1, 1995, pp. 1141-1149, vol. 35.

(Continued)

*Primary Examiner* — Alton N Pryor
(74) *Attorney, Agent, or Firm* — Cantor Colburn LLP

(57) ABSTRACT

The present invention relates to a herbicide composition comprising a first compound, belonging to the aryloyxphenoxyprionate family, and a second compound, belonging to the cyclohexanedione family. Said composition is characterized in that the first compound and the second compound are present in said composition at a ratio varying from 1:1.5 to 1:4. The present invention also relates to a method for controlling at least one weed capable of developing in a crop field for a plant to be cultivated with said composition of the invention. Finally, the use of the herbicide composition for treating a dicot crop is also claimed.

12 Claims, No Drawings

(56) References Cited

OTHER PUBLICATIONS

Harker et al., Synergistic Mixtures of Sethoxydim and Fluazifop on Annual Grass Weeds, Weed Technology, Jan. 1, 1991.
Drew et al., Herbicide Use, Productivity, and Nitrogen Fixation in Field Pea (*Pisum sativum*), Australian Journal of Agricultural Research, Jan. 1, 2007, pp. 1204-1214, vol. 58.

\* cited by examiner

HERBICIDAL COMPOSITION

BACKGROUND OF THE INVENTION

This invention relates to the herbicide composition sector.

The invention's main application is in the area of treating or eliminating plants deemed to be harmful for various crops.

More particularly, the invention relates to an herbicidal composition principally containing two active compounds. The first of these compounds contains a compound belonging to the aryloxyphenoxypropionate family and the second compound belongs to the cyclohexanedione family.

Traditionally, herbicides are defined as being active substances or preparations used to combat weeds or "unwanted plants".

In certain configurations, selective herbicides are used. These enable beneficially favorable means to control weeds whilst at the same time not preventing the growth of the crop being grown.

A "weed", as defined is a plant that accidentally colonizes a territory, without having been voluntarily sown, for example, a type of undesirable plant, existing in a field cropped with another species of plant.

The presence of weeds in a crop is more or less harmful to the crop, mainly due to the effects of competition with the cultivated plant, for example, with respect to water, light, or minerals contained in the soil.

A weed may be a non-cultivated plant which overtakes a field where plants are voluntarily grown by a farmer, or may also be regrowth from an earlier crop, for example, cereal regrowth in a crop of oilseed rape.

A weed may also be an annually growing plant, which only grows during a particular season, or a perennial plant, meaning a plant which grows for more than one annual cycle.

Numerous herbicidal compositions, intended to treat weeds, are renowned for their state of the art.

These compositions incorporate, generally speaking, at least one active component, traditionally made up of a chemical molecule and displaying herbicidal properties against more than one type of weed.

The patent document WO 2004/080171 described examples of such herbicidal compositions.

Thus, one may recognize, in the state of the art, herbicidal compositions containing components belonging to the aryloxyphenoxypropionate family, also called FOPs, as their active ingredient.

Herbicidal compositions in which the active ingredient is made up of a chemical molecule belonging to the cyclohexanedione family are also recognized.

However, usage of such herbicidal compositions has led to the occurrence of weeds that are resistant to this type of component.

There are also, in the prior art, herbicidal compositions incorporating, on the one hand, an aryloxyphenoxypropionate, quizalofop-p-ethyl and, on the other hand, a cyclohexanedione, clethodim.

More particularly, in this composition, quizalofop-p-ethyl and clethodim are introduced in equivalent proportions. Thus, the aforementioned compositions contain 10.5%, in weight, of quizalofop-p-ethyl and 10.5%, in weight, of clethodim, each of these compounds being present in a concentration of 100 g/L. In other words, the ratio between the quizalofop-p-ethyl and the clethodim is 1:1, which means that the two active compounds of the composition have equal concentrations.

However, the Applicant has documented that such a ratio does not enable optimal properties in terms of efficiency and spectrum of action.

There continues to be, in the state of the art, the patent document U.S. Pat. No. 5,629,262, which refers to a grass test procedure in crops, in which two acetyl-coA carboxylase inhibitors are applied. These inhibitors may be products belonging to the cyclohexanedione family, such as sethoxydim, clethodim or caloxydim.

It is described that various quantities of application of these products on crops, including 0.0125 to 0.08 pounds of active ingredient (lbs.ai)/acre of clethodim.

DETAILED DESCRIPTION OF THE INVENTION

However, the Applicant has documented that the application of two herbicidal compounds belonging to two different families, at a particular ratio and very specific, enables a substantial improvement in the treatment of weeds.

Thus, the invention offers the possibility of alleviating various disadvantages in the state of art by offering an herbicidal composition displaying a particularly interesting efficiency in the treatment of weeds.

More specifically, this herbicidal composition favors the control of these weeds with respect to compositions known in the state of the art. Further, the said composition displays a broad spectrum of efficiency, and, as a result, enables the effective treatment and control of various undesirable plants, without preventing the growth of a crop of plants that one wishes to see further develop.

To this end, this invention is related to a herbicidal composition having at least a first compound belonging to the aryloxyphenoxypropionate family and at least a second compound belonging to the cyclohexanedione family, the aforementioned composition being characterized in that the first compound and the second compound are both containing in the same composition in accordance with a variable ratio of 1:1.5 to 1:4, or from 1:1.5 to 1:3, or from 1:1.5 to 1:2.5, or from 1:1.75 to 1:2.25, or from 1:1.8 to 1:2.2.

This means that the quantity of the aforementioned second compound in the composition is 1.5 to 4 times, or 1.5 to 3 times, or 1.5 to 2.5 times, or 1.75 to 2.25 times, or from 1.8 to 2.2 times greater than that quantity of the aforementioned first compound.

Further, in the composition referred to in the invention, the proportion of the first compound is from 31.2 to 35.7%, and the proportion of the second compound in the aforementioned composition is from 64.3 to 68.8%.

It has indeed been demonstrated by the Applicant that such ratios between the first compound and the second compound enable an increased efficiency of the herbicidal composition in controlling weeds deemed to be unwanted plants in fields of crops.

In a beneficial manner, the ratio between the first component belonging to the aryloxyphenoxypropionate family and at the second compound belonging to the cyclohexanedione family is in the order of 1:2.

This means that the quantity of the aforementioned second compound, a cyclohexanedione, in the composition referred to in the invention is two times greater than the quantity of the aforementioned first compound, a aryloxyphenoxypropionate, the proportion of the first compound in the aforementioned composition being in the order of 33.3% and the proportion of the second compound in the aforementioned composition being in the order of 66.7%.

This particular and specific ratio between the compounds of the herbicidal composition enables a particularly optimum treatment using the aforementioned composition in the treatment of weeds.

Another particularity of the invention is that, the first compound belonging to the aryloxyphenoxypropionate family is selected from quizalofop-p-ethyl, haloxyfop, propaquizafop, quizalofop-p-tefuryl, fluazifop-p-butyl and fenoxaprop-ethyl, isomers of these compounds and salts of these compounds.

Currently, with respect to the second compound, belonging to the cyclohexanedione family, this is beneficially selected from among clethodim, cycloxydim, and tepraloxydim, the isomers of these compounds and the salts of these compounds.

More specifically, the compound belonging to the aryloxyphenoxypropionate family is quizalofop-p-ethyl and the compound belonging to the cyclohexanedione family is clethodim.

Quizalofop-p-ethyl, combined with clethodim, enables a particularly effective treatment of weeds.

In some completion procedures, the mass concentration of the first compound belonging to the aryloxyphenoxypropionate family varies from 65.6 to 75 g/L of composition and in which the mass concentration of the second compound belonging to the cyclohexanedione family varies from 135 to 144.4 g/L of composition.

In one completion procedure, the mass concentration of the first compound belonging to the aryloxyphenoxypropionate family is from 70 g/L of composition and in which, the mass concentration of the second compound belonging to the cyclohexanedione family is from 140 g/L of composition.

The invention also relates to a test procedure on at least one weed capable of developing in a field cultivated with a crop, with the composition referred to in the invention including at least a first compound belonging to the aryloxyphenoxypropionate family and at least a second compound belonging to the cyclohexanedione family.

Under this procedure, the aforementioned composition is diluted from 0.2 to 1.5 L, or from 0.5 to 0.8 L, in a total volume of 50 to 300 L of an appropriate aqueous solution and this whole amount of the aforementioned composition is applied, on a per hectare basis, to the field.

The rate of application for the aforementioned first compound is 13.1 to 112.5 g/ha of field space, whereas the rate of application for the aforementioned second compound is from 27 to 216.6 g/ha.

As a priority, the rate of application for the aforementioned first compound is from 32.8 to 60 g/ha of field space, or from 35 to 56 g/ha, and the rate of application for the aforementioned second compound is from 67.5 to 115.5 g/ha, or from 70 to 112 g/ha.

Beneficially, prior to the application stage of the herbicidal compound to the aforementioned field space, the said composition is mixed with an adjuvant oil.

The invention also relates to a usage of the current herbicidal composition for controlling at least one weed belonging to the grasses family.

In particular, the aforementioned composition may be used for the elimination of annual bluegrass (*Poa annua*) and/or couch grass (*Elytrigia repens*) and/or bromeae (*bromus* sp.) and/or cereal regrowth, including common wheat regrowth (*Triticum aestivum*) and/or barley regrowth (*Hordeum vulgare*) and/or rye-grass (*Lolium* sp.) and/or blackgrass (*Alopecurus myosuroides*) and/or hairy crabgrass (*Digitaria sanguinalis*) and/or barnyard grass (*Echinochloa crus-galli*) and/or common millet (*Panicum miliaceum*) and/or foxtail millet (*Setaria* sp.) and/or sorghum (*Sorghum halepense*).

Interestingly enough, the herbicidal composition is used in the treatment of dicotyledonous crops. More specifically, this crop is selected from among oilseed rape (*Brassica napus*), beetroot (*Beta vulgaris*), peas (*Pisum sativum*), sunflowers (*Helianthus annuus*), flax (*Linum usitatissimum*), soybeans (*Glycine max*), lucerne (*Medicago sativa*).

Other characteristics and benefits of the invention arise from the detailed description which shall follow the invention's non-exhaustive delivery modes.

This invention relates to a specific herbicidal composition.

This composition essentially contains at least two active ingredients enabling it to combat undesirable weeds.

Thus the composition incorporates, on the one hand, at least one of the first compounds belonging to the aryloxyphenoxypropionate family, compounds within this family are also referred to as FOPs, or FOP compounds in the following description.

On the other hand, the herbicidal composition referred to in invention contains at least, also, a second compound belonging to the cyclohexanedione family, the compounds of this family are also referred to as DIMs in the following description.

In other words, it is likely that this composition contains a multitude of compounds belonging to the aryloxyphenoxypropionate family, and a multitude of compounds belonging to the cyclohexanedione family.

In other cases, the composition contains a compound belonging to the aryloxyphenoxypropionate family, and a compound belonging to the cyclohexanedione family.

It is highly beneficial that the composition contains only, in so far as active substances, a compound belonging to the aryloxyphenoxypropionate family, and a compound belonging to the cyclohexanedione family.

In it particularly beneficial that the ratio between the compound from the FOPs family and the compound from the DIMs family may vary, from a ratio of 1:1.5 up to a ratio of 1:4, or from a ratio of 1:1.8 up to a ratio of 1:2.2.

In other words, the composition, referred to in invention, the compound from the DIMs family is present in a more sizeable quantity than the compound from the FOPs family.

"Quantity", within the current description means a mass of a pure compound, in grams (g), contained in the herbicidal composition of the invention. Thus it relates to the mass, in grams, of the DIM compound and the FOP compound.

Thus, a compound from the DIMs family may be contained in a 1.5 times greater quantity to the quantity of the FOP compound within the herbicidal composition, where the ratio between the FOP compound and the DIM compound is from 1:1.5. Consequently, proportions of active substances of the composition may beneficially be between 40% mass of the FOP compound and 60% mass of the DIM compound, or from 35.7% mass of the FOP compound and 64.3% mass of the DIM compound in some modes of delivery.

Further, it has been indicated that the quantity of DIM compounds may go up to 2.2 times or up until 4 times the quantity of the FOP compound. In this case, the ratio between the FOP compound and the DIM compound is from 1:2.2 or 1:4 and the composition contains, in proportion to the active substances, 31.2% mass of the FOP compound and 68.8% mass of the DIM compound or 20% mass of the FOP compound and 80% mass of the DIM compound.

In certain delivery modes, the ratio between the compound belonging to the aryloxyphenoxypropionate family and the compound belonging to the cyclohexanedione family is in the order of 1:2, or again equal to 1:2.

In this event of this particularly beneficial figure, the quantity of the DIM compound in the herbicidal composition is 2 times greater than the quantity of the aryloxyphenoxypropionate compound.

In other words, the herbicidal composition of the invention may include, in proportion to the active substances, in the order of 33.3% mass of the FOP compound on the one hand, and in the order of 66.7% mass of the DIM compound on the other hand.

In certain delivery modes, the mass concentration of the DIM compounds within the aforementioned composition is from 140 g/L of the foregoing. The compound belonging to the aryloxyphenoxypropionate family is thus contained in a mass concentration of 70 g/L of the composition.

"Mass concentration" means the mass (in grams) of a compound, either a FOP compound or a DIM compound, in a volume equal to 1 L of herbicidal composition.

A liter of herbicidal composition referred to in invention thus contains, on the one hand, a quantity of 70 grams of the pure FOP compound and, on the other hand, a quantity of the pure DIM compound of 140 grams, which corresponds to a ratio between these compounds of 1:2.

However, such an example does not limit the invention, and the mass concentration of the DIM compound may vary between 50 to 840 grams/liter or between 135 to 144.4 g/L. In respect of the mass concentration of aryloxyphenoxypropionates, this may beneficially vary between 35 to 210 g/L or from 65.6 to 75 g/L. The ratio between the aryloxyphenoxypropionate compound and the DIM compound must, in this respect, be from 1:1.5 to 1:4, or in the order of 1:1.8 to 1:2.2, this ratio being equal to approximately 1:2 in some delivery modes, as already referred to the foregoing.

Reference has indeed been made, by the Applicant, to such an adjustment with respect to the herbicidal compositions of the previous art, in which the two active compounds are contained in equal concentrations and in equal proportions within the composition, enabling an improvement of herbicidal properties.

The results set out in detail in examples 1 and 2 here below, show that the current composition has improved herbicidal activity with respect to existing compositions.

To return to the compound belonging to the aryloxyphenoxypropionate family, or FOPs, included in the composition referred to in the invention, this may be beneficially selected from among the following molecules: quizalofop-p-ethyl, haloxyfop, propaquizafop, quizalofop-p-tefuryl, flauzifop-p-butyl and fenoxaprop-ethyl.

This compound may also be selected from among the isomers or salts containing quizalofop-p-ethyl, haloxyfop, propaquizafop, quizalofop-p-tefuryl, flauzifop-p-butyl and fenoxaprop-ethyl.

The herbicidal composition referred to in the invention may also incorporate several compounds belonging to the aryloxyphenoxypropionate family, as referred to in the foregoing, for example two of these compounds or even more. In this case, the ratio between the compounds belonging to the aryloxyphenoxypropionate family and the DIM compound varies from 1:1.5 to 1:4, or from 1:1.8 to 1:2.2 in certain cases.

Haloxyfop consists of a chemical herbicide substance having the molecular formula $C_{15}H_{11}ClF_3NO_4$. It is also referred to as haloxyfop-p or haloxyfop-R.

Propaquizafop has a molecular formula of $C_{22}H_{22}ClN_3O_5$.

Regarding the quizalofop-p-tefuryl compound, this has a molecular formula of $C_{22}H_{21}ClN_2O_5$.

Flauzifop-p-butyl has a molecular formula of $C_{19}H_{20}ClNO_4$, and is generally hydrolyzed into flauzifop-p once it is absorbed by the targeted plant. Flauzifop-p-butyle is also hydrolyzed into flauzifop-p once it is absorbed by the targeted plant.

Fenoxaprop-p-ethyl has a molecular formula of $C_{10}H_{16}ClNO_5$.

These compounds are active against annual and perennial plants.

In one particular delivery mode, the compound used in the herbicidal composition contains quizalofop-p-ethyl.

This chemical compound contains a phytosanitary substance having a molecular formula of $C_{19}H_{17}ClN_2O_4$.

Quizalofop-p-ethyl is absorbed by the plant onto which the composition referred to in invention is applied to, generally by way of spraying. The chemical compound is then dispatched, via sap, to the growing areas of the plant, usually the leaves, shoots or roots. Inside these areas, the compound disrupts their development, consequently leading to the stoppage of growth and the spreading of this plant.

More generally, all compounds to the chemical family of FOPs act, notably on the growth areas by inhibiting the targeted plant's synthesis of lipids, and more specifically the enzyme, acetyl-coenzyme A carboxylase which also acts in these growth areas.

With respect to the compound belonging to the cyclohexanedione family, this is beneficially selected from among, clethodim, cycloxydim and tepraloxydim.

This compound may also be selected from among the isomers or salts of the clethodim, cycloxydim and tepraloxydim compounds.

More specifically, this compound consists of clethodim.

Thus, in one delivery mode, the herbicidal composition referred to in invention contains quizalofop-p-ethyl and clethodim in the ratios, percentages and concentrations as defined in the foregoing.

Clethodim is a chemical compound belonging to the cyclohexanedione family and is an active substance having an herbicide effect. The molecular formula of clethodim is $C_{17}H_{26}ClNO_3S$.

Clethodim may be the only active substance in some herbicidal compositions referred to in the state of the art. However, certain crops, for example crops of oilseed rape or peas may be sensitive to this substance. Thus the plant that is actively being cultivated is susceptible to suffer some damage during treatment to the crop, which is undesirable.

Clethodim's delivery mode works by inhibiting the synthesis of plant's fatty acids. A plant's fatty acids are essential to the integrity of cellular membranes, as well to being essential for a new plant's growth.

More specifically, clethodim acts by inhibiting acetyl-coenzyme A carboxylase (or ACC), which is the second enzyme involved in the process of synthesis, of fatty acids on the one hand, and on the other hand, the process of synthesis of flavonoids.

Other mixtures of FOPs and DIMs are particularly interesting. In particular, the following mixtures:
Haloxyfop and clethodim;
Propaquizafop and clethodim;
Fenoxaprop and clethodim;
Flauzifop-p-butyl and clethodim;
Quizalofop-p-tefuryl and clethodim;
Quizalofop-p-ethyl and clethodim; and
Quizalofop-p-ethyl and tepraloxydim.

The herbicidal composition referred to in invention enables the product to perform with increased efficiency and thoroughness against all species of weeds deemed to the harmful to crops. Furthermore, the aforementioned composition enables a particularly efficient treatment against annuals and perennials.

Further, as some plant species appearing in Europe are resistant to compounds from the family of ACC inhibitors, the combination of two compounds in the particular ratio of this invention, beneficially enables herbicidal efficiency.

Thus the herbicidal composition which has been developed, is a tool allowing for the control of resistant weed species, which are difficult, even impossible to eradicate. The aforementioned composition may also enable be used to combat the occurrence of resistant plants.

To this effect, this invention is also a means of controlling at least one weed, whether it be an annual or perennial plant, capable of spreading throughout a crop of other plants, which is actively being grown.

The means of controlling the aforementioned weed is carried out by using the herbicidal composition referred to in invention and whose formula is set out in detail here below, by applying the composition to the field crop.

Beneficially, the composition used in the means of controlling the weed includes quizalofop-p-ethyl and clethodim in a variable ratio of 1:1.5 to 1:4, or from 1:1.8 to 1:2.2; this ratio being equal to 1:2 in certain delivery modes.

Pursuant to certain delivery modes, the aforementioned composition is applied by spraying it onto the field where the targeted weeds are growing and spreading.

Beneficially, the aforementioned composition is applied following the emergence of the weeds that are to be treated, meaning that the composition is applied between the time when the young plant emerges from the soil and the time it attains maturity.

In certain delivery modes, the herbicidal composition referred to in the invention is applied in the volume of 0.2 to 1.5 liters per hectare (ha) to the field being treated. In certain delivery modes, this volume to be applied includes between 0.5 to 0.8 liters per hectare.

In other words, the rate of application of the first compound belonging to the family of FOPs, including quizalofop-p-ethyl, goes from 8.5 to 315 grams per hectare of field, or from 13.1 to 112.5 grams per hectare of field, depending upon the mass concentration of FOP compound, which was previously noted.

In certain cases, this rate of application of the compound belonging to the FOPs family goes from 17 to 170 grams per hectare, or from 32 to 60 grams per hectare. Depending upon other scenarios, the rate of application of the FOP composition is from 35 to 56 grams per hectare.

In respect of the rate of application of the compound belonging to the DIMs family, and beneficially containing clethodim, it is applied at a rate from 13 to 1260 grams per hectare, or from 27 to 216.6 grams per hectare, or depending upon certain scenarios, from 26 to 670 grams per hectare, or from 67.5 to 115.5 grams per hectare, depending upon the mass concentration of aforementioned clethodim. Depending upon the particular means of delivery, this rate varies from 7 to 112 grams per hectare.

It is also possible that the aryloxyphenoxypropionate compound may be applied in amounts varying from 10 to 30 grams per hectare of field and the cyclohexanedione compound be applied in amounts varying from 20 to 60 grams per hectare.

The aryloxyphenoxypropionate compound may also be used at a rate of 14 grams per hectare and the cyclohexanedione compound at a rate of 28 grams per hectare.

The aryloxyphenoxypropionate compound may also be used at a rate of 24.5 grams per hectare and the cyclohexanedione compound at a rate of 49 grams per hectare.

The invention also relates to a usage of the herbicidal composition whereby the aryloxyphenoxypropionate compound may also be used at a rate including between 10 and 30 grams per hectare and whereby the cyclohexanedione compound is applied at a rate of between 20 and 60 grams per hectare.

Under one scenario, the use of the herbicidal composition is carried out with the aryloxyphenoxypropionate compound applied at a rate of 14 grams per hectare and the cyclohexanedione compound at a rate of 28 grams per hectare.

Finally, under another scenario, the invention refers to the use of the herbicidal composition in such a way that the aryloxyphenoxypropionate compound is applied at a rate of 24.5 grams per hectare and the cyclohexanedione compound at a rate of 49 grams per hectare.

Beneficially, a total volume of at least 50 liters per hectare may be applied to the field, varying in certain cases from 150 to 300 liters per hectare and in other cases from 200 to 250 liters per hectare to the field.

Consequently, prior to the application stage, the herbicidal composition is diluted in a total volume as indicated in the previous paragraph.

Beneficially, the aforementioned herbicidal composition is diluted into either an aqueous solution, including at least water, and possibly consisting of an aqueous emulsion, for example.

The aqueous solution may include other compounds such as a stabilizing compound and/or a surfactant, for example.

The total volume applied to the crop may also include, other compounds other than the herbicidal composition and the aqueous solution.

Indeed, beneficially, prior to the application of the herbicidal composition to the crop stage, the composition may be mixed with at least an adjuvant oil, which is capable of increasing the herbicidal composition's efficiency.

In one delivery example, a volume is mixed from between 0.2 to 1.5 liters of the composition, or between 0.5 to 0.8 liters of the composition, with the volume in the order of 1.0 liters of adjuvant oil for a hectare of field, prior to adding it to the aqueous solution, to reach a total volume including between 50 and 300 liters per hectare of the said field.

More specifically, the association of such an adjunct oil with the aforementioned composition enables the later to be kept on the surface of the targeted plant's leaf, thus leading to a much higher quantity of the active substance penetrating the circulatory system of the said plant.

Any type of adjunct oil may be mixed with the invention's herbicidal composition.

Specifically, the herbicidal composition may act with either a plant-based oil or an oil derived from petroleum or from an animal oil.

With respect to a plant-based adjuvant oil, as a matter of preference, this may consist of an esterified rape-seed oil commercialized under the name of Actirob® B 1.0.
Actirob® B 1.0 is hereinafter referred to as "Actirob".

Where a petroleum based oil is used, it may consist of, for example, a paraffin mineral oil.

The herbicidal composition referred to in this invention is particularly efficient for controlling and eliminating weeds belonging to the Grass family (or Graminaea). Plants from this family may also be referred to as Poaceae.

Grasses are herbaceous plants, either annuals or perennials, and this family also groups together a large number of species.

In particular, certain cereal crops which are cultivated, such as corn, wheat, barley, etc., belong to the grass family. Cereals may, indeed, also be considered as undesirable plants in certain fields of crops, including when a field previously served as a field for growing a species of cereal, and which is then intended to be used to grow another crop.

Unwanted cereal regrowth may also be capable of developing and, for this reason, enter into competition with the cultivated variety.

More specifically, the herbicidal composition as referred to in the invention may be optimally used to eliminate at least one weed selected from among the following weeds: annual bluegrass (*Poa annua*), couch grass (*Elytrigia repens*), bromeae (*bromus* sp.), cereal regrowth, including common wheat regrowth (*Triticum aestivum*), barley regrowth (*Hordeum vulgare*), rye-grass (*Lolium* sp.), blackgrass (*Alopecurus myosuroides*), hairy crabgrass (*Digitaria sanguinalis*), barnyard grass (*Echinochloa crus-galli*), common millet (*Panicum miliaceum*), foxtail millet (*Setaria* sp.), sorghum (*Sorghum halepense*).

However, it is also possible that the composition be used to control any other types of weeds belonging to the grass family.

Thus, the herbicidal composition as referred to in the invention enables a wide range of species of undesirable plants that are capable of developing and spreading throughout any given crop to be controlled. The composition also slows the growth of any such undesirable plants.

Indeed, the herbicidal composition referred to in the invention may be used for the treatment of large variety of plants that are voluntarily cultivated.

Thus, the aforementioned composition may be beneficially used in the treatment of dicotyledonous crops.

More specifically, the composition ensures the treatment of at least one weed in a dicotyledonous crop, selected from among oilseed rape (*Brassica napus*), beetroot (*Beta vulgaris*), peas (*Pisum sativum*), sunflowers (*Helianthus annuus*), flax (*Linum usitatissimum*), soybeans (*Glycine max*), lucerne (*Medicago sativa*).

However, it is possible to treat even more types of crops using this composition.

Unless stated otherwise, any scientific terms and techniques used hereinafter shall have the same meaning as those jointly referred to in the state of the art in the sector which this invention falls into.

Although similar or equivalent methods and materials to those described hereinafter may be used in practice or in trials involving the invention, the appropriate methods and practices are described in this description.

Any applications, publications, patents and other references cited here are wholly incorporated by any reference herein. In the event of a dispute, this application, including any definitions herein, is deemed authentic.

In this application, singular forms "one" and "the" shall include any references to plurals unless the context clearly indicates otherwise.

In this application, numeric values are often set out in ranges of numbers throughout this document. Ranges of numbers are mainly used for ease of management and brevity and must not be interpreted as being strictly limitative with respect to the invention's scope in any way.

Consequently, the use of ranges of numbers expressly includes any possible sub-domains and any other individual numeric values included in this range, and any numeric values in these ranges or sub-domains, together with any fractions of the said numeric values or said whole numbers within these ranges, unless the context expressly indicated otherwise. This applies in all circumstances to all number ranges and in any context throughout this application. Thus, for example, a range of numbers from 40 to 60% includes 41 to 59%, 42-58%, 43-57%, 41-58%, 41-57%, 41-55%, 41-54%, 41-53%, and so on.

In this application, a series of ratios is used mainly for ease of management and brevity and must not be interpreted as being strictly limitative with respect to the invention's scope in any way.

The use of a series of ratios includes combinations of the higher ratio and lower ratio to provide ratios in the form of a range of numbers. This concept applies in all circumstances to all ranges of ratios and in any context throughout this application.

This invention is generally disclosed hereinafter and uses affirmative language to describe numerous delivery modes. The invention also includes specific delivery modes in which a particular object is excluded, either in whole or in part, for example, substances or materials, stages of methods and conditions, protocols, procedures, trials or analyses.

Thus, although the invention is generally not set out hereinafter in terms formalizing what the invention excludes, aspects which are not expressly included in the invention must, however, be deemed to be hereby disclosed.

The here below examples enable the efficiency of the aforementioned composition against certain weeds including, rye-grass (*Lolium* sp.) and/or blackgrass (*Alopecurus myosuroides*) in crops of varied species such as oilseed rape (*Brassica napus*) or beetroot (*Beta vulgaris*) to be highlighted.

Example 1: Efficiency Test of the Herbicidal Composition on Rye-Grass

Trials have been conducted to demonstrate the efficiency of the herbicidal composition referred to in the invention on the weed known as rye-grass. This plant, also called bluegrass or Italian rye-grass (*Lolium multiflorum*) is traditionally considered to be a pest.

The composition has been tested on different parcels of oilseed rape (OSR for Oilseed rape, *Brassica napus*).

The test results are summarized in the table 1 here below.

Different trials have been conducted in different fields where oilseed rape (OSR) is grown. The efficiency of different products and of the herbicidal composition referred to in the invention have been evaluated at different time intervals following the application of the said products to the crop in question (DAA means "days after application"). For example, the efficiency of products has been measured 53 and 58 days after application to the field of oilseed rape. These intervals following application of the composition are necessary and adequate to enable the ultimate efficiency of the trialed products to be judged.

TABLE 1

| | | | | Trial | | |
|---|---|---|---|---|---|---|
| | | | | ALS11H56-02 | ALS11H56-04 | ALS12H56-03 |
| | | | | | Crop | |
| | | | | OSR | OSR | OSR |
| | | | | Interval Evaluation Application | | |
| | Average | Minimum | Maximum | 53 DAA | 53 DAA | 58 DAA |
| ALSNC10HCLC02 0.8 + Actirob | 92.7 | 88 | 98 | 88 | 98 | 92 |
| Clethodim 100 g/L + quizalofop-p-ethyl 100 g/L (a formula of 1:1 applied to 0.4-0.5 L/ha) + Actirob | 83.3 | 75 | 95 | 80 | 95 | 75 |
| quizalofop-p-ethyl (1.2 L/hectare) | 56.7 | 26 | 76 | 26 | 76 | 68 |
| flauzifop-p-butyl (1.5 L/hectare) | 38.3 | 3 | 66 | 3 | 66 | 46 |

Findings relating to damages caused by the different compounds that were trialed are set out in percentages of weeds eliminated from 0 to 100% with respect to a trialed lot in which no herbicidal treatment was applied. The number, 0, corresponds to no observed damage to weeds whereas the number, 100, corresponds to an elimination of the entirety of the weeds.

The composition identified as ALSNC10HCLQ01 0.8 relates to an herbicidal composition referred to in the invention. This composition ALSNC10HCLQ01 0.8 includes quizalofop-p-ethyl and clethodim, these two compounds being included in the composition at a ratio of 1:2.

More specifically, the aforementioned herbicidal composition ALSNC10HCLQ01 0.8 contains a mass concentration of 70 g/L of quizalofop-p-ethyl and mass concentration of 140 g/L of clethodim.

Further, a volume of 0.8 L of the aforementioned composition has been applied per hectare to the treated lot.

Quizalofop-p-ethyl and flauzifop-p-butyl belong to the aryloxyphenoxypropionate family. A volume of 1.2 L of quizalofop-p-ethyl per hectare and a volume of 1.5 L of flauzifop-p-butyl per hectare have respectively been applied.

Formulas including quizalofop-p-ethyl and clethodim in the ratio of 1:1 are jointly referred to as Q+C 1:1, in the examples.

In these formulas, quizalofop-p-ethyl and clethodim are incorporated in equal proportions. In other words, the ratio between the quizalofop-p-ethyl and the clethodim is 1:1.

The compositions—ALSNC10HCLQ01 0.8 and Q+C 1:1 (0.4-0.5 liters per hectare) and quizalofop-p-ethyl (1.2 liters per hectare) which were tested have been diluted, prior to their application, in 1 L of adjuvant oil (Actirob).

Results from the trials clearly show that, on the one hand, the herbicidal composition referred to in this invention, displayed improved efficiency with respect to herbicidal compounds used on their own, such as quizalofop-p-ethyl and flauzifop-p-butyl.

On the other hand, the herbicidal composition referred to in the invention also enables the trialed weeds, such as rye-grass, to be controlled more effectively than with Q+C 1:1.

Indeed, the herbicidal composition displays an average efficiency of 92.7% as opposed to the Q+C 1:1 which has an average efficiency in the order of 83.3%.

Further, for each of the trials that were carried out, the herbicidal composition referred to in the invention has shown an improved efficiency with respect to other different products that were tested in parallel.

Consequently, the modification to the ratio between the two active molecules in the herbicidal composition referred to in the invention has actually enabled the improvement of the efficiency of the aforementioned composition in treating rye-grass.

Example 2: Efficiency Test of the Herbicidal Composition on Blackgrass

Trials were also carried out to show the efficiency of the herbicidal composition referred to in the invention on a second weed called blackgrass. This plant is an annual plant and has traditionally been seen as a weed in cultivated fields.

The composition was tested on crops including crops of beetroot (Sugar beet, *Beta vulgaris*), oilseed rape (OSR, *Brassica napus*).

Findings from the tests have been summarized in table 2 here below.

TABLE 2

| | Average | Minimum | Maximum | ALS11H42-02 OSR 46 DAA | ALS11H56-01 OSR 50 DAA | ALS12H48-05 OSR 44 DAA |
|---|---|---|---|---|---|---|
| ALSNC10HCLQ01 0.8 Actirob | 87 | 72 | 95 | 72 | 95 | 94 |
| Clethodim 100 g/L + quizalofop-p-ethyl 100 g/L (a formula of 1:1 applied to 0.4-0.5 L/ha) + Actirob | 73.7 | 45 | 89 | 45 | 89 | 87 |
| quizalofop-p-ethyl (1.0 to 1.2 L/hectare) + Actirob | 47.7 | 30 | 63 | 30 | 63 | 50 |
| flauzifop-p-butyl (1.5 L/hectare) | 64.0 | 52 | 76 | — | 76 | 52 |

Trial No. / Crop / Interval Evaluation Application

The same compounds that were used in Example 1 were evaluated for efficiency.

The herbicidal composition referred to in the invention, identified in the table here above as ALSNC10HCLQ01 have the same clethodim and quizalofop-p-ethyl formula as the composition that was tested in Example 1.

In the same manner as for Example 1, different trials were carried out in different fields, in each which a plant of interest was cultivated.

In this example, tests were carried out on two plots of oilseed rape, on the one hand, and in a lot of beetroot on the other hand.

The efficiency of different products and the herbicidal composition referred to in the invention have been evaluated at different intervals following the application (DAA) of the aforementioned products onto the crop in question.

For example, the efficiency of products has been measured at 44, 46 and 50 days following application of the products.

As for Example 1, the test results that were carried out to the blackgrass highlight that the composition referred to in the invention enable more efficient control of this weed in various crops, with respect to other compounds that are recognized in the state of the art.

Indeed, for all test results set out in table 2, this composition shows a better elimination of weeds, whether that be in crops of oilseed rape or beetroot.

TABLE 3

| | | Quantity of active ingredient g/ha | Clethodim | Quizalofop-P-ethyl | Triticum aestivum / Winter wheat / BBCH 24 / 54 | Hordeum vulgare / Winter barley / BBCH 24 / 54 | Lolium multiflorum / Ryegrass / BBCH 24 / 54 | Alopecurus myosuroides / Blackgrass / BBCH 24 / 54 | Bromus sterilis / Bromea / BBCH 24 / 54 |
|---|---|---|---|---|---|---|---|---|---|
| 1 | Untreated control | | | | 38 | 38 | 38 | 38 | 38 |
| 2 | (Clethodim 140 g/L + Quizalofop-P-ethyl 70 g/L) | 0.2 l/ha | 28 | 14 | 97.5 | 98.8 | 100 | 97 | 100 |
| 3 | (Clethodim 140 g/L + Quizalofop-P-ethyl 70 g/L) | 0.35 l/ha | 49 | 24.5 | 100 | 100 | 100 | 100 | 100 |
| 4 | (Clethodim 140 g/L + Quizalofop-P-ethyl 70 g/L) | 0.5 l/ha | 70 | 35 | 100 | 100 | 100 | 100 | 100 |
| 5 | (Clethodim 240 g/L) | 0.11 l/ha | 26.4 | — | 60 | 50 | 85 | 90 | 70 |
| 6 | (Clethodim 240 g/L) | 0.2 l/ha | 48 | — | 82.5 | 85 | 100 | 95 | 96.5 |
| 7 | (Clethodim 240 g/L) | 0.29 l/ha | 69.6 | — | 100 | 100 | 100 | 100 | 100 |
| 8 | (Quizalofop-P-ethyl 120 g/L) | 0.11 l/ha | | 13.2 | 90 | 50 | 60 | 60 | 87.5 |
| 9 | (Quizalofop-P-ethyl 120 g/L) | 0.2 l/ha | — | 24 | 100 | 96.5 | 95 | 75 | 100 |
| 10 | (Quizalofop-P-ethyl 120 g/L) | 0.29 l/ha | — | 34.8 | 100 | 98 | 100 | 92.5 | 100 |
| 11 | (Clethodim 100 g/L + Quizalofop-P-ethyl 100 g/L) | 0.4 l/ha | 40 | 40 | 100 | 100 | 100 | 92.5 | 100 |
| | Synergy calculated using Colby equation | | | | | | | | |
| | Between treatments 5 and 8 | | | | 96 | 75 | 94 | 96 | 96.25 |
| | Between treatments 6 and 9 | | | | 100 | 99.475 | 100 | 98.75 | 100 |
| | Between treatments 7 and 10 | | | | 100 | 100 | 100 | 100 | 100 |

$(Eff.A + Eff.B) - (Eff.A * Eff.B)/100$  Colby Equation

All treatments have been applied with an adjuvant oil (Actirob at 1.0 l/ha). Treatments were carried out on stage 3 leaves, at the beginning of the tallage stage (BBCH 13-21).

Results: means of treatment: % efficiency with respect to the untreated control area; Untreated control area: level of infestation in numerous plants/m$_2$.

Efficiencies calculated with Colby equations were comparable with efficiencies observed with ALSNC10HCLQ01 indicating a synergy with this formula.

The abbreviation "BBCH" used in table 3 and elsewhere throughout the application is a reference to the BBCH code (Biologische Bundesanstalt, Bundessortenamt and Chemische Industrie) usually used in the industry for identifying stages of a plant's phenological development, for numerous cultivated species.

Of course, the invention is not limited to the previously described and highlighted herbicidal compositions which may display variables and modifications without, however, falling outside the invention's gambit.

The invention claimed is:

1. A method of controlling a weed capable of developing in a cropped field of cultivated plants, the method comprising:
   a) providing a herbicidal composition comprising synergistic amounts of a first compound belonging to an aryloxyphenoxypropionate family, and a second compound that is clethodim, wherein the first compound and the second compound are in a mass ratio of 1:2 to 1:4 respectively, wherein the first compound and the second compound are the only herbicidal actives in the composition;

b) diluting the herbicidal composition in an aqueous solution; and c) applying the diluted herbicidal composition to a cropped field of cultivated plants to control at least one weed, wherein the first compound is selected from the group consisting of quizalofop-p-ethyl, quizalofop-p-tefuryl, isomers of the foregoing compounds, salts of the foregoing compounds and combinations of one or more of the foregoing, and wherein the first compound is applied at a rate of between 8.5 to 315 g/ha and the second compound is applied at a rate of between 20 to 670 g/ha.

2. The method according to claim 1, wherein 0.2 to 1.5 L of the herbicidal composition is diluted in a total volume of about 50 to about 300 L of an aqueous solution.

3. The method according to claim 1, further comprising the step of mixing the herbicidal composition with an adjuvant oil prior to step b).

4. The method according to claim 1, wherein the at least one weed is a grass.

5. The method according to claim 4, wherein the weed is selected from the group consisting of annual bluegrass (*Poa annua*), couch grass (*Elytrigia repens*), bromeae (*bromus sp.*), regrowth of cereals, including winter wheat regrowth (*Triticum aestivum*), barley (*Hordeum vulgare*), rye-grass (*Lolium* sp.), blackgrass (*Alopecurus myosuroides*), hairy crabgrass (*Digitaria sanguinalis*), barnyard grass (*Echinochloa crus-galli*), common millet (*Panicum miliaceum*), foxtail millet (*Setaria* sp.), and sorghum (*Sorghum halepense*).

6. The method according to claim 1, wherein the cropped field comprises a dicotyledonous crop.

7. The method according to claim 6, wherein the dicotyledonous crop is selected from the group consisting of oilseed rape (*Brassica napus*), beetroot (*Beta vulgaris*), peas (*Pisum sativum*), sunflowers (*Helianthus annuus*), flax (*Linum usitatissimum*), soybeans (*Glycine max*) and lucerne (*Medicago sativa*).

8. The method according to claim 1, wherein the first compound is applied at a rate of between 10 to 30 g/ha and the second compound is applied at a rate of between 20 to 60 g/ha.

9. The method of claim 1, wherein the first compound and the second compound are in a mass ratio of 1:4 respectively.

10. The method of claim 1, wherein the first compound and the second compound are in a mass ratio of 1:2 respectively.

11. The method of claim 1, wherein the first compound is quizalofop-p-ethyl.

12. The method of claim 1, wherein the first compound is quizalofop-p-tefuryl.

* * * * *